US006568407B1

(12) United States Patent
Matsumiya et al.

(10) Patent No.: US 6,568,407 B1
(45) Date of Patent: May 27, 2003

(54) AUTOMATIC WASHING DEVICE FOR A WORKPIECE TO BE MEASURED AND AUTOMATIC PRODUCTION SYSTEM PROVIDED WITH THE SAME

(75) Inventors: Sadayuki Matsumiya, Kanagawa (JP); Masayoshi Uneme, Yamatokoriyama (JP); Yasushi Fukaya, Niwa-gun (JP); Kazuo Yamazaki, 1500, 7th St., #7-0, Sacramento, CA (US) 95814

(73) Assignees: Mitutoyo Corporation, Kawasaki (JP); Mori Seiki Co., Ltd., Yamatokoriyama (JP); Okuma Corporation, Nagoya (JP); Kazuo Yamazaki, Sacramento, CA (US)

( * ) Notice: Subject to any disclaimer, the term of this patent is extended or adjusted under 35 U.S.C. 154(b) by 0 days.

(21) Appl. No.: 09/529,791

(22) PCT Filed: Aug. 28, 1998

(86) PCT No.: PCT/JP98/03839

§ 371 (c)(1),
(2), (4) Date: May 15, 2000

(87) PCT Pub. No.: WO00/12232

PCT Pub. Date: Mar. 9, 2000

(51) Int. Cl.[7] .................................................. G08B 3/02
(52) U.S. Cl. ................. 134/56 R; 134/57 R; 134/58 R; 134/201
(58) Field of Search ............................ 134/56 R, 57 R, 134/58 R, 137, 201

(56) References Cited

U.S. PATENT DOCUMENTS

| 4,396,987 A | * | 8/1983 | Inaba et al. ................. 700/159 |
| 4,595,419 A | * | 6/1986 | Patenaude ....................... 134/1 |
| 4,993,913 A | * | 2/1991 | Ohtsuki ....................... 180/901 |
| 5,447,574 A | * | 9/1995 | Inoue .......................... 134/123 |

FOREIGN PATENT DOCUMENTS

| DE | 40 37 522 A1 | * | 4/1991 |
| JP | 60-67184 | | 5/1985 |
| JP | 61-239109 | | 10/1986 |
| JP | 3-29473 | | 4/1991 |
| JP | 6-74910 | | 3/1994 |

* cited by examiner

Primary Examiner—Randy Gulakowski
Assistant Examiner—Joseph Perrin
(74) Attorney, Agent, or Firm—Oliff & Berridge PLC

(57) ABSTRACT

An automatic production system includes an automatic washing device usable to wash off swarf left on a workpiece by an NC machine tool. The automatic washing device is used before measuring a portion of a workpiece using a three dimensional measuring device controlled by a measuring part program controlling the three dimensional measuring device. When automating an operation of the washing device, a washing program is produced based on the a measuring part program controlling the three dimensional measuring device to be able to efficiently wash a minimal area of the work piece encompassing the portion of the workpiece to be measured.

10 Claims, 3 Drawing Sheets

AUTOMATIC WASHING DEVICE FOR A WORKPIECE TO BE MEASURED AND AUTOMATIC PRODUCTION SYSTEM PROVIDED WITH THE SAME

TECHNICAL FILED

The present invention relates to an automatic washing device for a workpiece to be measured and an automatic production system provided with the same, for automatically washing off swarf left on the workpiece to be measured as a preceding process prior to the workpiece measurement by means of a measuring device such as a three dimensional measuring device.

BACKGROUND FIELD

An NC machine tool is known as a typical device in an automatic production device. The NC machine tool has functions both of automatically changing rotating tools such as a drill and of automatically manufacturing the workpiece by moving the tool in the three dimensional directions according to a predetermined contour program to manufacture the workpiece to the predetermined shape and size by changing a plurality of tools in accordance with a manufacturing process program from a control device. The manufactured workpiece is sent to the measuring device to measure a manufactured part of the workpiece and evaluate and judge a manufactured result. The workpiece is sent to a following process such as an assembly process after that.

After manufacturing the workpiece by the NC machine tool, as it is necessary to remove swarf and burr left on the workpiece and dissipate heat generated during manufacturing before measuring the workpiece by the measuring device, it has been proposed in Japanese patent publication (Kokoku) NO. 3-29473 to automate the work such as the removing and the heat dissipation (cooling). According to this proposal, although the automatic control in the constant washing device is carried out on the basis of an information signal for controlling the NC machine tool, problems still remain as follows.

(1) It is difficult to undergo automation because it is impossible to obtain the manufacturing information easily, even if it is intended to measure the predetermined part of the workpiece, which is conveyed from the other production system, by the measuring device.

(2) It generates loss of working time because of washing the whole of the manufactured part, even if it is necessary to measure only a part of the workpiece manufactured by the NC machine tool.

An object of the present invention is to provide an automatic washing device for a workpiece to be measured which can quickly remove the swarf left on a part of the workpiece to be measured, thereby starting measurement of the manufactured part of the workpiece by the measuring device, and accordingly, increasing productivity in the workpiece production line.

DISCLOSURE OF INVENTION

A washing device according to the present invention comprises an automatic washing device for washing a measuring part of a workpiece before measuring a predetermined shape of the workpiece according to a measuring part program, and wherein the automatic washing device is provided with a washing program producing unit for producing a washing program from the measuring part program, with the washing program controlling the washing device.

Furthermore, a device according to one exemplary embodiment of the present invention comprises a main body that accommodates a workpiece from an outside; a robot mechanism provided with an arm movable in three dimensional directions; a liquid ejecting nozzle fixed to the arm that ejects a pressurized liquid; and an air ejecting nozzle fixed to the arm that ejects compressed air, wherein the automatic washing device is provided with a washing program producing unit that produces a washing program from the measuring part program, with the washing program controlling the washing device.

Furthermore, a device according to another exemplary embodiment of the present invention comprises a main body that accommodates a workpiece from outside; a robot mechanism provided with an arm movable in three dimensional directions; a liquid ejecting nozzle fixed to the arm that ejects a pressurized liquid; an air ejecting nozzle fixed to the arm that ejects compressed air; and a temperature adjusting unit that adjusts the temperature of the pressurized liquid and compressed air, wherein the automatic washing device is provided with a washing program producing unit that produces a washing program from the measuring part program, with the washing program controlling the washing device.

Furthermore, an automatic production system applied to the present invention comprises an NC machine tool for carrying out a manufacturing control of a workpiece according to an NC program; a measuring device for feeding back a measurement result from automatically measuring a manufacturing part of the workpiece by the NC machine tool; and an automatic washing device for automatically removing swarf left on the workpiece manufactured by the NC machine tool, wherein the automatic washing device is provided with a washing program producing unit for producing a washing program according to a measuring part program.

Moreover, an automatic production system according to the present invention comprises an NC machine tool that carries out manufacturing control of a workpiece according to an NC program; a measuring device that feeds back a measurement result obtained by automatically measuring a manufactured part of the workpiece by the NC machine tool; and an automatic washing device that automatically removes a swarf left on the workpiece manufactured by the NC machine tool, wherein the automatic washing device is provided with a main body that accommodates a workpiece from an outside, a robot mechanism provided with an arm movable in three dimensional directions, a liquid ejecting nozzle fixed to the arm and that ejects a pressurized liquid, an air ejecting nozzle fixed to the arm and that ejects a compressed air, and a washing program producing unit that controls the robot mechanism according to a measuring part program for controlling the measuring device.

According to the washing device of the present invention, because the washing device can quickly and efficiently remove the swarf on the workpiece to quickly start to carry out the measurement, it can increase productivity of the workpiece production line by optimally utilizing the working ability of the automatic production device and achieve an increase in manufacturing precision.

Furthermore, when the washing device according to the present invention is applied to the production line connected by on-line, it can be used for a plurality of NC machine tools in common, and, accordingly, has advantages in layout, working efficiency, and economy.

BEST MODE FOR CARRYING OUT THE INVENTION

Figure 1:
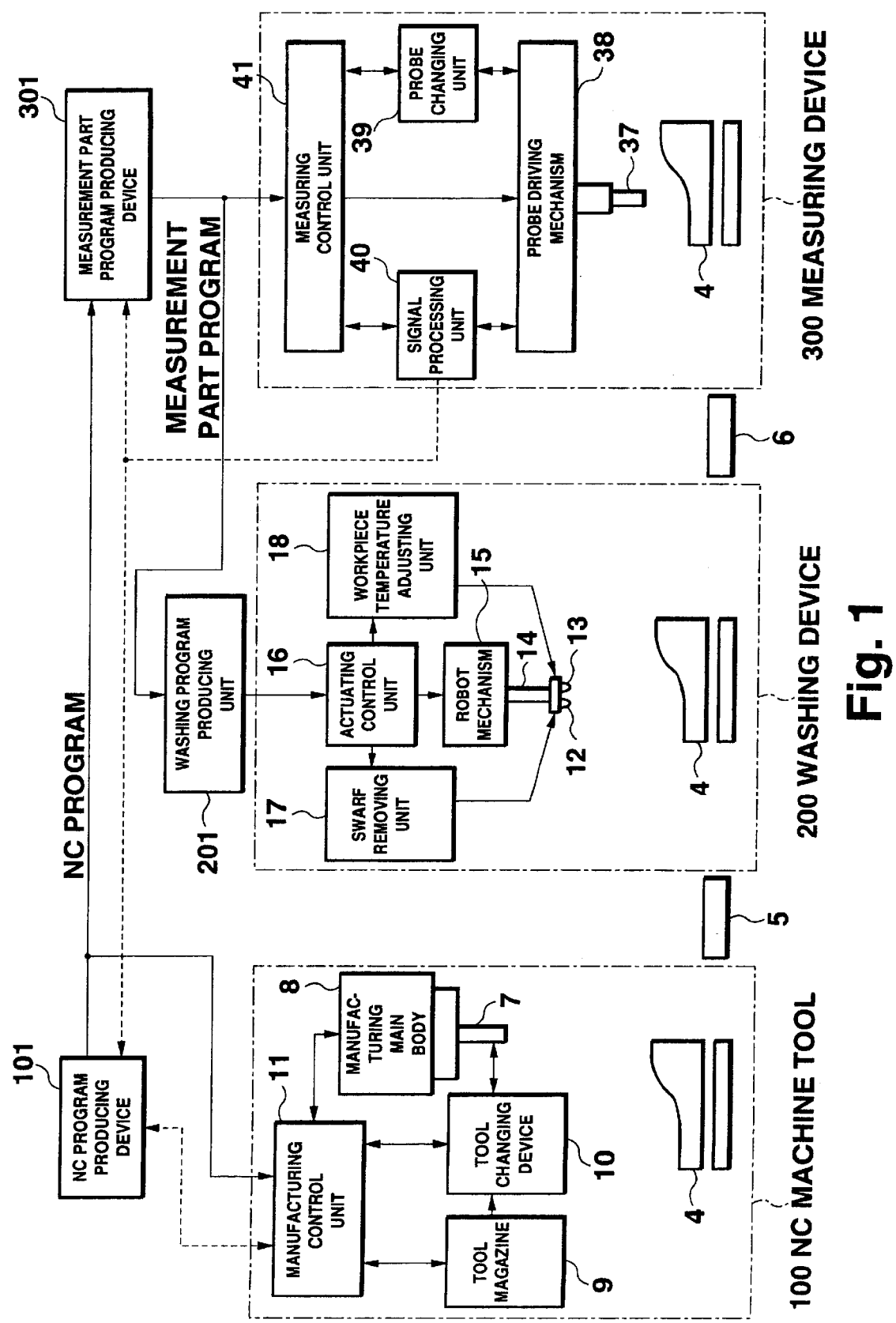
FIG. 1 is a block diagram for explaining a relationship among the NC machine tool, the washing device and the measuring device applied respectively to the automatic production line according to the present invention.

FIG. 1 is a block diagram showing an automatic production line provided with a washing device which is one embodiment in the present invention. On the production line, an NC machine tool 100 having the function of the automatic production device, a washing device 200, a measuring device 300 for a three dimensional measurement, are positioned in turn. The workpiece 4 is conveyed from the NC machine tool 100 to the washing device 200 and further from the washing device to the measuring device by a conveying robot 5, 6.

The measured result from the measuring device 300 about the manufacturing part of the workpiece 4 is fed back to an NC program producing device 101. The NC machine tool, the washing device 200 and the measuring device 300 are positioned on the automatic workpiece production line, and they are connected to each by on-line. Although only one NC machine tool is shown in FIG. 1, a plurality of NC machine tools are arranged in parallel on the production line, and the workpiece 4 manufactured by them is conveyed to the common washing device for washing.

First of all, the NC machine tool will be described. The NC machine tool 100 is provided with a manufacturing main body 8, which has, for example, a rotating tool 7 such a drill, for manufacturing the workpiece 4 by three-dimensionally moving the tool 7 in the orthogonal directions of three x, y and z axes. Many tools 7 different in their respective types and diameters are accommodated in a tool magazine 9. A tool changing device 10 is arranged between the manufacturing main body 8 and the tool magazine 9. Using the tool changing device 10, the tool 7 selected from the tool magazine 9 is attached to the manufacturing main body 8 and the tool 7 attached in the main body 8 is accommodated at a predetermined position of the tool magazine 9. A manufacturing control unit 11 is connected to the manufacturing main body 8, the tool magazine 9 and the tool changing device 10. The manufacturing control unit 11 operates each of devices 8, 9 and 10 according to a predetermined manufacturing process program. In other words, the workpiece 4 is manufactured to the desired shape and size by three-dimensional movement after changing the predetermined tool 7 from the manufacturing main body 8. Although the NC machine tool 100 is operated as a whole by a NC program, in this automatic production line, the NC program is applied as an output from an NC program producing device 101. The program producing device 101 has the function of automatically producing the NC program according to data about the finished shape and material of the workpiece. Further, as data resulting from the output program is interchanged between the NC machine tool 100 and the measuring device 300, the-program producing device 101 also has a learning function of producing the more preferred NC program by storing and evaluating the obtained result.

Next, the washing device 200 in the embodiment will be described. The washing device 200 includes a robot mechanism 15 having an arm 14 provided with both a liquid ejecting nozzle 12 and an air ejecting nozzle 13. Furthermore, in order to operate a robot mechanism 15, an operating control 16 moves the arm 14 in the orthogonal directions of three x, y and z axes in accordance with the predetermined process. A swarf removing unit 17 includes the liquid ejecting nozzle 12 and removes the swarf and so on left on the workpiece 4, which is manufactured by the NC machine tool 100, by ejecting the compressed liquid from the liquid ejecting nozzle 12, with the compressed liquid being adjusted to a predetermined temperature. A workpiece temperature adjusting unit 18 includes the air ejecting nozzle 13, and dries the workpiece 4 by ejecting the compressed air, adjusted to the predetermined temperature, from the air ejecting nozzle 13 so as to adjust the workpiece 4 to the predetermined temperature. The temperature of the compressed air and the compressed liquid also helps dissipate the heat of the workpiece generated during manufacturing.

The actuating control unit 16 for actuating the robot mechanism 15 is applied with the washing program from a washing program producing unit 201. The output of a measuring part program producing device 301 for producing the measuring part program on receiving the NC program of the NC machine tool 100, is applied to the washing program producing unit 201. In other words, the washing program producing 201 of the present invention can produce the washing program for controlling the washing device 200 on the basis of the measuring part program. Therefore, according to the present invention, it is possible to start the washing quickly by using the measuring part program in the measuring device 300 positioned at the lower part on the production line, without measuring the shape of the conveyed workpiece 4.

When the washing program from the washing program producing unit 201 is applied to the actuating control unit 16 in the washing device 200, the actuating control unit 16 ejects both the compressing liquid from the liquid ejecting nozzle 12 and the compressed air from the air ejecting nozzle 13 to the predetermined measuring part of the workpiece to be measured by the measuring device 300.

Figure 2:
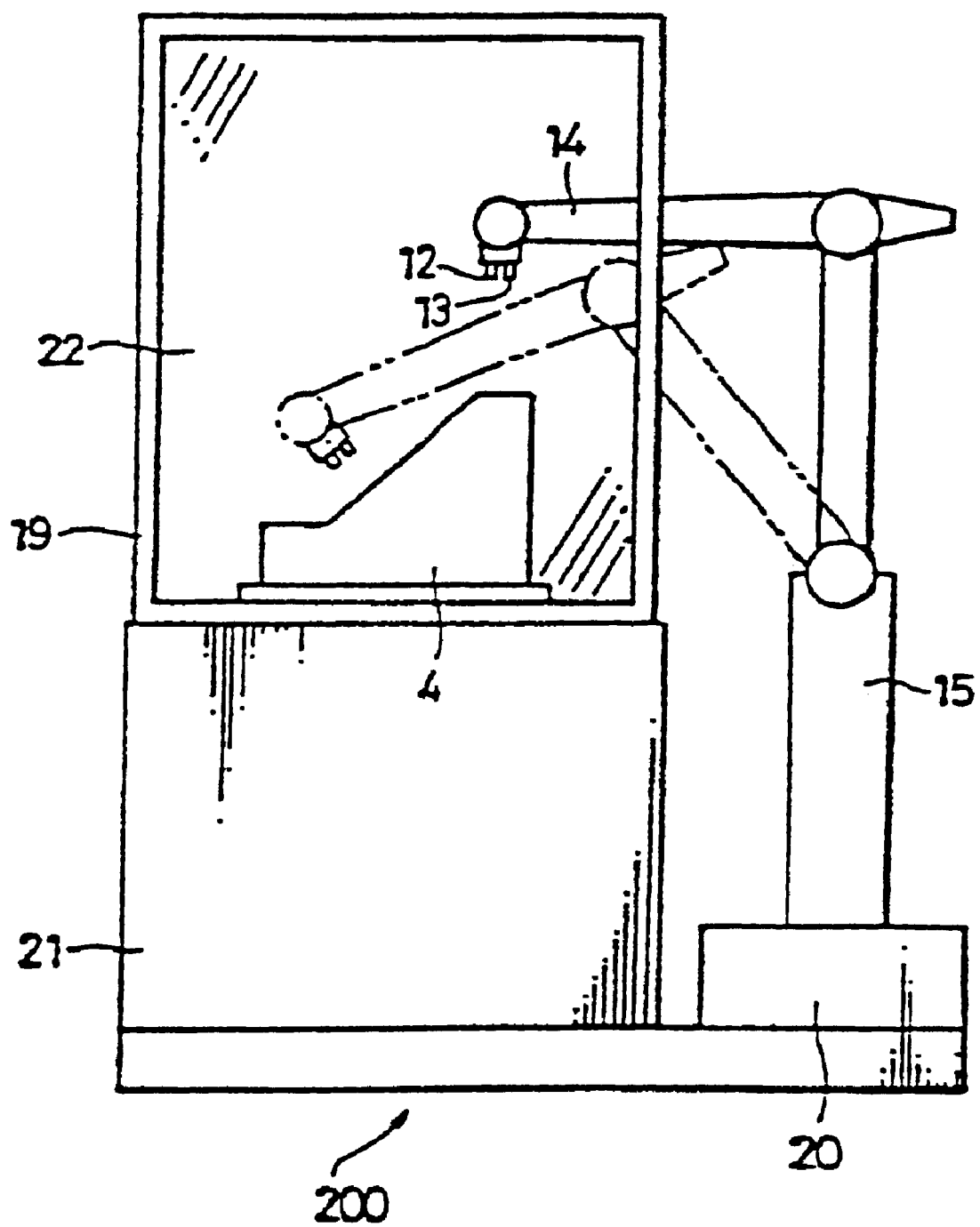
FIG. 2 is a side view showing an overall structure of the washing device applied to the device shown in FIG. 1.

FIG. 2 is a side view showing the overall structure of the washing device 200. A robot mechanism 15 fixed on the base table 20 is arranged in the side of a main body of the washing device 200. The main body 19 has a control box 21 in the lower portion and a washing chamber 22 in the upper portion. In the control box 21, there are accommodated a tank for storing the compressing liquid ejected from the liquid ejecting nozzle 12 and apparatuses consisting of the swarf removing unit 17 and the workpiece temperature adjusting unit 18. The washing chamber 22 is defined all around by a transparent plate, a bellows seal member is provided in a side so as to insert the arm 14 of the robot mechanism 15 into the inside of the washing chamber 22 in the sealing condition. The arm 14 is moved in the three dimensional directions inside the washing chamber 22. The arm 14 can move in the three dimensional directions because the bellows sealing member has elasticity, the washing chamber 22 being sealed by the bellows seal member.

Figure 3:
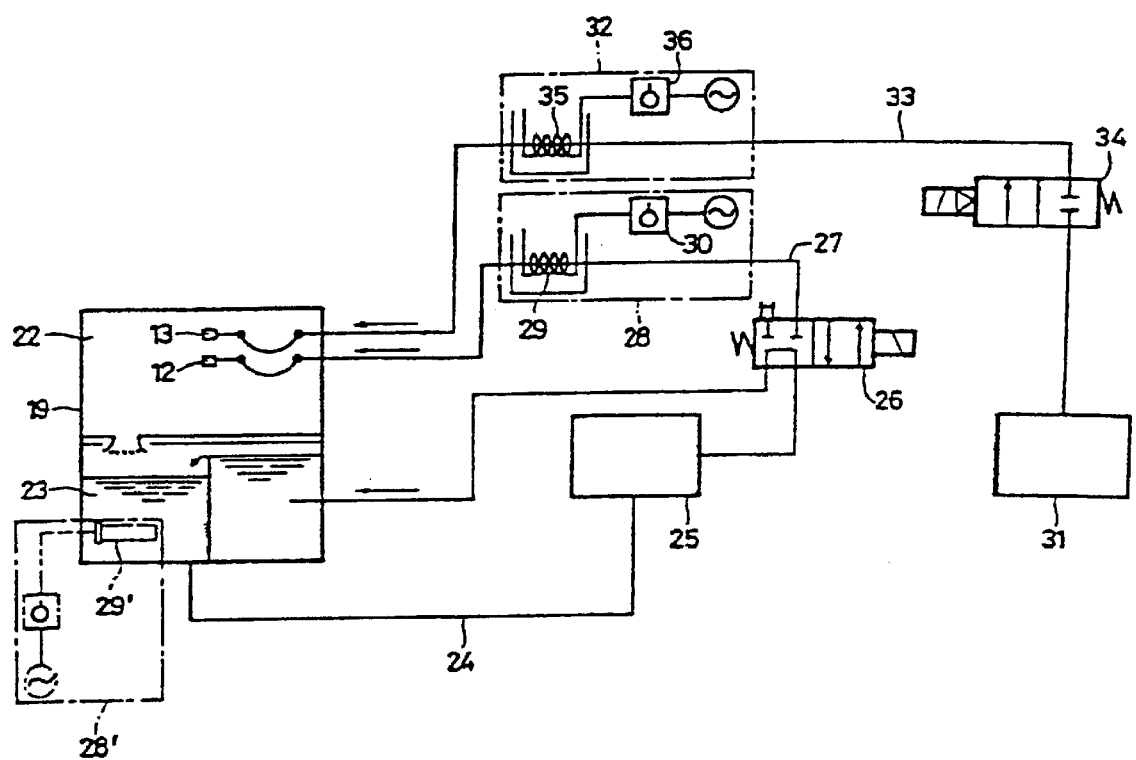
FIG. 3 shows circuit arrangements in a swarf removing unit and a workpiece temperature adjusting unit which are respectively applied to the washing device.

FIG. 3 shows circuit arrangements of the swarf removing unit 17 and the workpiece temperature adjusting unit 18. A tank 23 provided with the interior of the control box 21 is connected to a liquid compressing unit 25 through a pipe 24, and the liquid compressing unit 25 includes a motor, pressure pump and so on driven by the motor. The liquid compressing unit 25 is connected to a pipe 27, which is provided with the liquid ejecting nozzle 12 at its top edge, through a switching valve 26. The washing liquid in the tank 23 is sucked by the liquid compressing unit 25, and ejected from the liquid ejecting nozzle 12 through the pipe 24, the switching valve 26 and the pipe 27 by compressing action. The liquid ejected in the washing chamber 22 is returned to the tank 23 and removed from the swarf and so on by a filter unit (not shown). This liquid is thus recycled.

A liquid temperature adjusting unit 28 is arranged in a part of the pipe 27, and comprises a heater 29 and a switch 30 adjusting a heat value of the heater 29 and adjusting the temperature of the pressurized liquid ejected from the liquid ejecting nozzle 12 at a constant temperature of 20° C.

The swarf removing unit 17 includes the ejected liquid nozzle 12, the liquid compressing unit 25 and the liquid temperature adjusting unit 28. Moreover, a liquid temperature adjusting 28' may be comprised by positioning a heater 29' in the tank 23, as shown in FIG. 3, without arranging the liquid temperature adjusting 28 in the pipe.

The workpiece temperature adjusting unit 18 consists of the air ejecting nozzle 13, an air compressing unit 31 and an air temperature adjusting unit 32. The air compressing unit 31 comprises the motor, the air compressing pump and soon driven by the motor. The air compressing unit 31 is connected to a pipe 33, which is provided with the air temperature adjusting unit 32, through a switching valve 34, and the top edge of the pipe 30 is arranged with the air ejecting nozzle 13. The air temperature adjusting unit 32 consists of a heater 35 and a switch 36 adjusting a heat value of the heater 35, and adjusts the temperature of the compressed air ejected from the air ejecting nozzle 13 at the same constant temperature as that of the pressurized liquid of 20° C.

Next, the measuring device 300 arranged in the automatic production line will be described. The measuring device 300 uses a general three dimensional measuring apparatus and has a touch signal probe 37 for sequentially touching predetermined parts on the surface of the workpiece carried on the table by the conveying robot 6. The touch signal probe 37 is driven in the three dimensional directions by a probe driving mechanism 38. A probe changing unit 39 brings a required probe from a plurality of the stored probes to change it on the probe driving mechanism 38. Furthermore, the measuring device 300 comprises a signal processing unit 40 for processing the measurement of the shape of the workpiece by using a signal obtained from the touch signal probe 37, a measuring control unit 41 for controlling the probe changing unit 39 and the probe driving mechanism 38. Though the measuring device 300 is operated as a whole by the measuring part program, in this automatic production line, the device 300 is applied as the output from a measurement part program producing device 301. The measuring part program producing device 301 has the function of automatically producing the measuring part program according to the NC program output from the NC program producing device 101. Further, as data resulting from the measuring part program is interchanged between the measuring device 300, the device 301 also has the learning function of producing the more preferred NC program by storing and evaluating the obtained result.

Next, the operation will be described.

In FIG. 1, the manufacturing main body 8 in the NC machine tool 100 manufactures the workpiece 4 by moving the tool 7 in the three dimensional directions. This manufacturing of the workpiece 4 is carried out by selecting and changing the required tool 7 from many tools 7 stored in the tool magazine 9. The three dimensional movement of the tool 7 and the selection and change of the tool 7 is performed according to the manufacturing process program in the manufacturing control unit 11. Thus, the workpiece 4 automatically manufactured by the NC machine tool 100 is conveyed to the washing device 200 by the conveying robot 5 and so forth to be set inside the washing chamber 22 in the main body 19 of the washing device 200. Next, the robot mechanism 15 driven by the driving control unit 16. The arm 14 of the robot mechanism 15 is moved in the three dimensional directions along the surface of the workpiece 4, by ejecting the pressurized liquid from the liquid ejecting nozzle 12 to remove the swarf, the burr and so on left on the workpiece 4 by the ejecting pressure of the pressurized liquid. Then, as the pressurized liquid is adjusted at the predetermined temperature by the liquid temperature adjusting unit 28, heat of the workpiece 4 during manufacturing is cooled, and as a result, the temperature of the workpiece 4 decreases.

The compressed air is ejected from the air ejecting nozzle 13 after finishing the ejection of the pressurized liquid, the arm 14 being moved again in the three dimensional directions, and the workpiece 4 being dried with the compressed air. Because this compressed air is also kept at the same temperature as the pressurized liquid by being adjusted to a predetermined temperature by the air temperature adjusting unit 32, the workpiece 4 is quickly cooled down to the required temperature.

As mentioned above, the washing program producing unit 201 produces the washing program in accordance with the measuring part program and outputs the washing program to the driving control unit 16. Therefore, the robot mechanism 15 is driven by the washing program corresponding to the measuring part program output from the measuring part program producing unit 301, the arm 14 moves the manufactured part of the workpiece 4 in the three dimensional directions. Because the pressurized liquid from the liquid ejecting nozzle 12 and the compressed air are ejected to the manufactured part, it can efficiently remove the swarf and so on and dissipate heat generated during manufacturing.

The workpiece 4 washed by the washing device 200 is sent to the measuring device 300 by the conveying robot 6. When the workpiece 4 is conveyed to the measuring device 300, because the swarf and so on are removed from the workpiece 4 and the workpiece 4 is cooled down to the predetermined temperature, it can immediately start to measure the size of the manufactured part of the workpiece 4. This measurement result is fed back to the NC program producing device 101 to correct the amount of the movement of the tool 7 for manufacturing new workpiece 4.

According to the washing device 200 in the present invention, by using the measuring part program, the robot mechanism in the washing device 200 is driven by the driving control unit 16 by ejecting both the pressurized liquid from the liquid ejecting nozzle 12 and the compressed air from the air ejecting nozzle 13 to the manufactured part of the workpiece 4. As a result, cooling of the workpiece 4, in which the temperature is raised by heat generated when removing the swarf and manufacturing the workpiece 4, can be accomplished in a short time. Furthermore, as it can quickly start to adjust the manufactured part of the workpiece 4 by the measuring device 300, it can increase productivity of the workpiece production line by optimally utilizing the improved working ability in the NC manufacturing device 100. Furthermore, because both the temperatures of the pressurized liquid and the compressed air are adjusted to the predetermined temperature by the liquid temperature adjusting unit 28 in the swarf removing unit 17 and the air temperature adjusting unit 32, it can cool the temperature of the workpiece 4 down to the suitable temperature for performing the measurement of the measuring device 300 in a very short time.

What is claimed is:

1. An automatic washing device usable to wash a manufactured portion of a workpiece to be measured, comprising:
   a washing program producing unit that produces a washing program based on a measuring part program, wherein:
      the measuring part program is based on a NC program and is usable to measure at least the manufactured portion of the workpiece, and
      the automatic washing device is usable to wash the manufactured portion, under control of the washing program.

2. The automatic washing device of claim 1, wherein the automatic washing device is arranged such that the device is capable of being used to wash the manufactured portion before the measuring part program is used to measure the manufactured portion of the workpiece.

3. An automatic washing device usable to wash a manufactured portion of a workpiece to be measured, comprising:
   a main body that accommodates the workpiece;
   a robot mechanism provided with an arm movable in three dimensional directions;
   a liquid ejecting nozzle, fixed to the arm, that ejects a pressurized liquid;
   a gas ejecting nozzle, fixed to the arm, that ejects a compressed gas; and
   a washing program producing unit that produces a washing program based on a measuring part program, wherein:
      the measuring part program is usable to measure at least the manufactured portion of the workpiece and is based on a NC program, and
      the automatic washing device is usable to wash the manufactured portion, under control of the washing program.

4. The automatic washing device of claim 3, wherein the automatic washing device is arranged such that the device is capable of being used to wash the manufactured portion before the measuring part program is used to measure the manufactured portion of the workpiece.

5. An automatic washing device usable to wash a manufactured portion of a workpiece to be measured, comprising:
   a main body that accommodates the workpiece;
   a robot mechanism provided with an arm movable in three dimensional directions;
   a liquid ejecting nozzle, fixed to the arm, that ejects a pressurized liquid;
   a gas ejecting nozzle, fixed to the arm, that ejects a compressed gas;
   a temperature adjusting unit that adjusts a temperature of at least one of the pressurized liquid and the compressed gas; and
   a washing program producing unit that produces a washing program based on a measuring part program, wherein:
      the measuring part program is usable to measure at least the manufactured portion of the workpiece and is based on a NC program, and
      the automatic washing device is usable to wash the manufactured portion, under control of the washing program.

6. The automatic washing device of claim 5, wherein the automatic washing device is arranged such that the device is capable of being used to wash the manufactured portion before the measuring part program is used to measure the manufactured portion of the workpiece.

7. An automatic production system, comprising:
   an NC machine tool usable to carry out a manufacturing control of a workpiece according to an NC program;
   a measuring device usable to automatically measure a manufactured portion of the workpiece manufactured using the NC machine tool and to feed back a measurement result for at least the manufactured portion; and
   an automatic washing device that automatically removes swarf left on at least the manufactured portion of the workpiece manufactured using the NC machine tool, wherein:
      the automatic washing device is provided with a washing program producing unit that produces a washing program according to a measuring part program,
      the measuring part program being used by the measuring device to measure at least the manufactured portion of the workpiece and being based on a NC program, and
      the automatic washing device being used to wash the manufactured portion, under control of the washing program.

8. The automatic washing device of claim 7, wherein the automatic washing device is arranged such that the device is capable of being used to wash the manufactured portion before the measuring part program is used to measure the manufactured portion of the workpiece.

9. An automatic production system, comprising:
   an NC machine tool that carries out manufacturing control of a workpiece according to an NC program;
   a measuring device usable to automatically measure a manufactured portion of the workpiece manufactured using the NC machine tool according to a measuring part program and to feed back a measurement result for at least the manufactured portion; and
   an automatic washing device that automatically removes swarf left on at least the manufactured portion of the workpiece manufactured using the NC machine tool, comprising:
      a main body that accommodates a workpiece,
      a robot mechanism provided with an arm movable in three dimensional directions,
      a liquid ejecting nozzle, fixed to the arm, that ejects a pressurized liquid,
      a gas ejecting nozzle, fixed to the arm, that ejects a compressed gas, and
      a washing program producing unit that produces a washing program based on the measuring part program, wherein the measuring part program is based on a NC program and the automatic washing device washes the manufactured portion, under control of the washing program.

10. The automatic washing device of claim 9, wherein the automatic washing device is arranged such that the device is capable of being used to wash the manufactured portion before the measuring part program is used to measure the manufactured portion of the workpiece.

* * * * *